US006226454B1

(12) United States Patent
Couture

(10) Patent No.: US 6,226,454 B1
(45) Date of Patent: May 1, 2001

(54) APPARATUS FOR HEATING AT A DISTANCE WITH LIGHT RADIANCE USING LAMPS ARRANGED IN A MATRIX ON A SUPPORT

(75) Inventor: Pierre Couture, Boucherville (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/499,349

(22) Filed: Feb. 8, 2000

(30) Foreign Application Priority Data

Feb. 9, 1999 (CA) .................................. 2260276

(51) Int. Cl.[7] .................................. F21V 7/00; H05B 1/00
(52) U.S. Cl. .................. 392/419; 392/412; 392/415; 392/414; 392/440; 362/238; 362/250; 362/378; 362/419; 250/495.1
(58) Field of Search .................. 392/419–421, 392/411–412, 415, 431, 413–414, 440; 362/232, 238–241, 247, 233, 227, 235, 250, 378, 418–419, 427–428, 449; 219/85.12, 85.13; 250/495.1, 504 R; 356/3.1; 34/266, 270

(56) References Cited

U.S. PATENT DOCUMENTS

| 1,278,026 | * | 9/1918 | Salto .................................. 392/421 |
| 2,315,124 | * | 3/1943 | Luzius .................................. 392/421 |
| 2,355,459 | * | 8/1944 | Miskella .................................. 34/266 |
| 2,610,280 | | 9/1952 | Wilson . |
| 2,619,585 | * | 11/1952 | Peters .................................. 392/422 |
| 3,225,184 | * | 12/1965 | Reiber .................................. 362/233 |
| 3,600,553 | * | 8/1971 | Costello .................................. 392/421 |
| 3,923,394 | * | 12/1975 | Frankiewicz .................................. 362/241 |
| 4,025,777 | * | 5/1977 | Hayakawa .................................. 362/250 |
| 4,025,778 | * | 5/1977 | Hayakawa .................................. 362/233 |
| 4,288,844 | * | 9/1981 | Fisher et al. .................................. 362/33 |
| 4,378,755 | | 4/1983 | Magnusson et al. .................................. 118/684 |
| 4,379,217 | | 4/1983 | Youmans .................................. 219/121 L |
| 4,900,891 | | 2/1990 | Vega et al. .................................. 219/121.6 |
| 5,335,308 | * | 8/1994 | Sorensen .................................. 392/412 |
| 5,417,389 | | 5/1995 | Chew et al. .................................. 244/134 R |
| 5,473,523 | * | 12/1995 | Fange .................................. 362/232 |
| 5,475,370 | | 12/1995 | Stern .................................. 340/583 |
| 5,484,121 | | 1/1996 | Padawer et al. .................................. 244/134 F |
| 5,526,237 | * | 6/1996 | Davenport et al. .................................. 362/32 |
| 5,597,140 | | 1/1997 | Madsen . |
| 5,667,296 | * | 9/1997 | Cheng et al. .................................. 362/267 |
| 5,805,769 | * | 9/1998 | Cook et al. .................................. 392/421 |
| 5,823,474 | | 10/1998 | Nunnally .................................. 244/134 E |

FOREIGN PATENT DOCUMENTS

| 354961 | * | 7/1961 | (CH) .................................. 362/227 |
| 2024996 | * | 12/1971 | (DE) . |
| 2504654 | * | 8/1976 | (DE) .................................. 392/419 |
| 55186 | | 10/1951 | (FR) . |
| 1007956 | * | 10/1965 | (GB) .................................. 392/421 |
| 545148 | * | 6/1956 | (IT) .................................. 392/412 |
| 10-255956 | * | 9/1998 | (JP) . |
| 98/56657 | | 12/1998 | (WO) . |

* cited by examiner

Primary Examiner—John A. Jeffery
(74) Attorney, Agent, or Firm—Foley & Lardner

(57) ABSTRACT

Apparatus and method for heating at a distance by light radiance includes a support and narrow-beam lamps mounted on the support in a matrix of lines and columns. Each of the lamps produce a luminous beam having a central axis of projection. The lamps in each column can be oriented to make their central axes converge to a first focal area. The lamps in each line can be oriented to make their central axes converge to a second focal area.

16 Claims, 16 Drawing Sheets

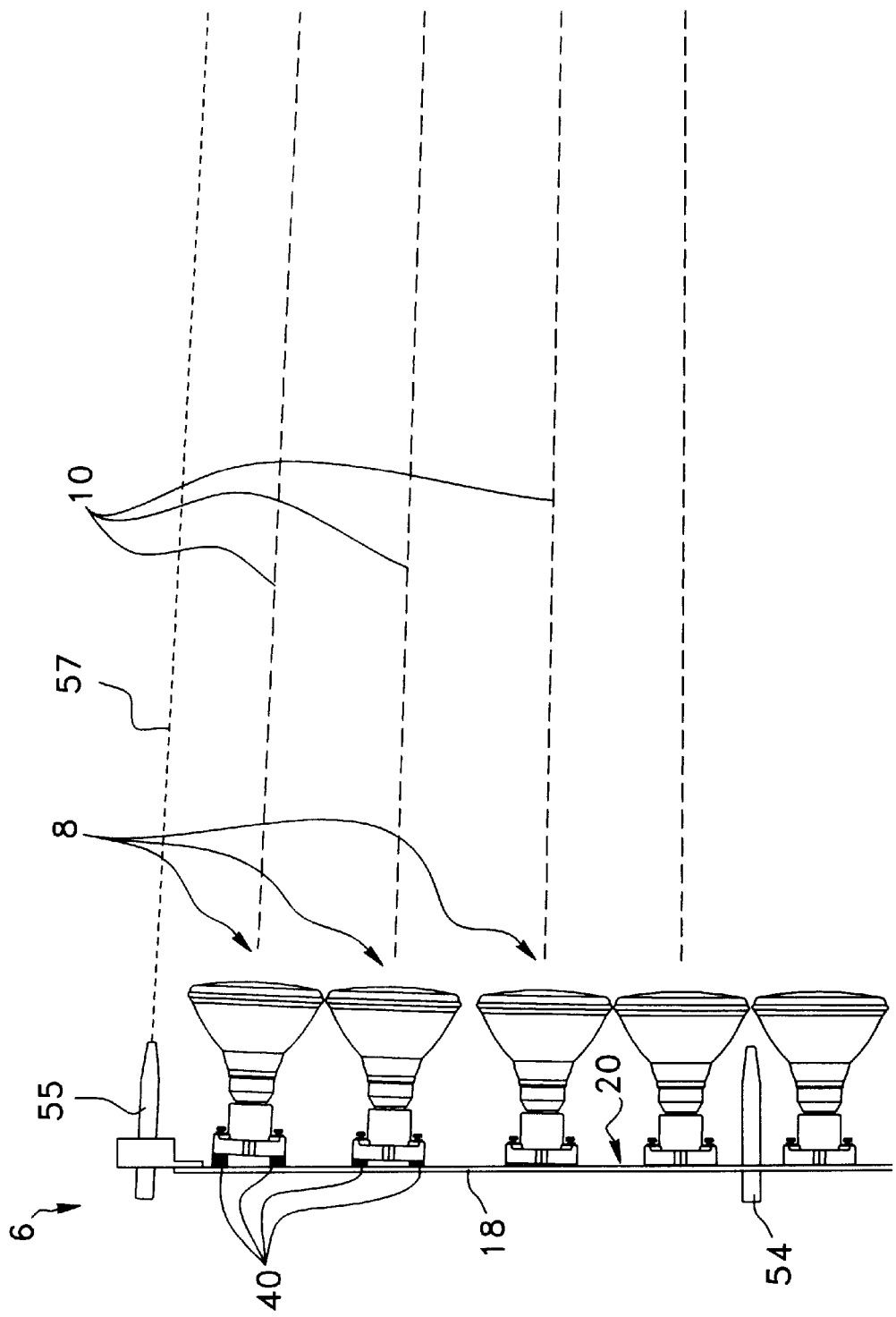

APPARATUS FOR HEATING AT A DISTANCE WITH LIGHT RADIANCE USING LAMPS ARRANGED IN A MATRIX ON A SUPPORT

FIELD OF THE INVENTION

The present invention relates to an apparatus and a method for heating at a distance by light radiance.

DESCRIPTION OF THE PRIOR ART

There exist in the prior art several documents describing different types of apparatuses for detecting and/or deicing portions of ice on a given surface.

Known in the prior art, there is U.S. Pat. No. 5,417,389 granted to CHEW and al. in which is described a method and an apparatus for deicing an aircraft. The heat source is generated by an apparatus which comprises a burner in order to heat a first surface. This first surface emits infrared radiation which is reflected on a second surface and thus, is redirected onto the surface to be deiced. Furthermore, these apparatuses are disposed under the roof of a hangar or other similar structure.

Also known in the art, there is U.S. Pat. No. 4,378,755 granted to MAGNUSSON et al. in which is described an apparatus for deicing an aircraft. This apparatus comprises a row of devices for vaporising a liquid or a gas or for irradiating a surface disposed in front of the device. This apparatus also comprises a system for automatically controlling the vaporisation or the irradiation according to the presence or not of a surface in front of the device.

Also known in the art, there is U.S. Pat. No. 5,597,140 granted to MADSEN in which is described an apparatus comprising several sources of infrared radiation organized in several rows where each of the rows is mounted under the roof of a hangar and is positioned at a given location under the roof of the hangar and at a desired height. This document describes the use of these luminous sources for deicing all the surface of an aircraft. These sources are always used in combination with a hangar, so as to heat the ambient air of the hangar.

Also known in the art, there is U.S. Pat. No. 4,379,217 granted to YOUMANS in which is described a method and an apparatus for thawing a given surface such as a field or a body of water. This thawing apparatus is mounted under a helicopter. This apparatus comprises several luminous sources mounted side by side.

Also known in the art, there is U.S. Pat. No. 4,900,891 granted to VEGA et al. in which is described a system comprising an assembly which generates a laser beam. This assembly comprises a lens to make a laser beam diverge. Preferably, this system comprises two assemblies producing each a unique beam and these two assemblies are jointly displaced along the surface to be deiced, namely, along the wing of an aircraft.

Known in the art, there is also U.S. Pat. No. 5,823,474 granted to NUNNALLY in which is described a system for detecting and deicing the ice on the surface of an aircraft. This system uses a unique laser beam for deicing a restrained area on the aircraft.

Known in the art, there is also U.S. Pat. No. 5,475,370 granted to STERN in which is described a system for detecting the ice or the snow on a reflecting metallic surface by using a polarised light.

Known in the art, there is also U.S. Pat. No. 4,484,121 granted to PADAWER et al. in which is described a system for detecting the presence of ice on an aircraft. This system is permanently installed on the aircraft.

The apparatuses and methods of the prior art allow to heat an object. However, for a given number of lamps, the intensity of heating remains limited.

An object of the present invention is to provide an apparatus and a method for heating an object by light radiance with a greater intensity of heat than what is possible with the apparatuses and methods of the prior art for a same number of lamps.

SUMMARY OF THE INVENTION

According to the present invention, there is provided an apparatus for heating at a distance by light radiance, comprising:

a support;

narrow-beam lamps mounted on the support, each of the lamps being able to produce a luminous beam having a central axis of projection; and convergence means cooperating with the support and the lamps to orientate said lamps so as to make the central axes of the luminous beams converged towards a first focal area in order to heat an object.

Also according to the present invention, there is provided a method for heating at a distance by light radiance, comprising the following steps:

activating narrow-beam lamps mounted on a support, each of the lamps being able to produce a luminous beam having a central axis of projection; and orienting the lamps by means of the support so as to make the central axes of the luminous beams produced by the lamps converged towards a first focal area in order to heat an object.

The objects, advantages and other features of the present invention will become more apparent upon reading of the following non-restrictive description of the preferred embodiments thereof, given for the purpose of exemplification only with reference to the accompanying drawings.

BRIEF DESCRIPTION OF THE DRAWINGS

FIG. 9 is an enlarged view of a portion of what is shown in FIG. 8.

DESCRIPTION OF THE PREFERRED EMBODIMENTS

In the following description, the same numerical references refer to similar elements. The embodiments shown in the figures are preferred. In the context of the present description, the expression "to deice" signifies to melt or sublimate ice and the word "light" includes visible light and infrared.

One of the particular advantages of the apparatus and of the method according to the present invention comes from the fact that air absorbs very little light photons, so that one can use the invention for heating at a distance by light radiance during cold weather and maximise the quantity of energy sent onto a part exposed to a flux of photons. Another advantage of the apparatus and of the method according to the present invention comes from the fact that light beams are insensitive to ambient air drafts.

The apparatus is relatively easy to maintain and its operating cost is modest. The fact of being able to defrost at a distance allows to increase the security for the personnel that is completing work outside during cold weather. The present apparatus produces an energy flux that can be used among other things, but not exclusively, to melt at a distance the ice on equipment parts of a transportation or power line whether it be electrically charged or not, to preheat equipment parts of said line, to impede the formation of ice or even to facilitate outside work of the personnel during winter.

Figure 1:
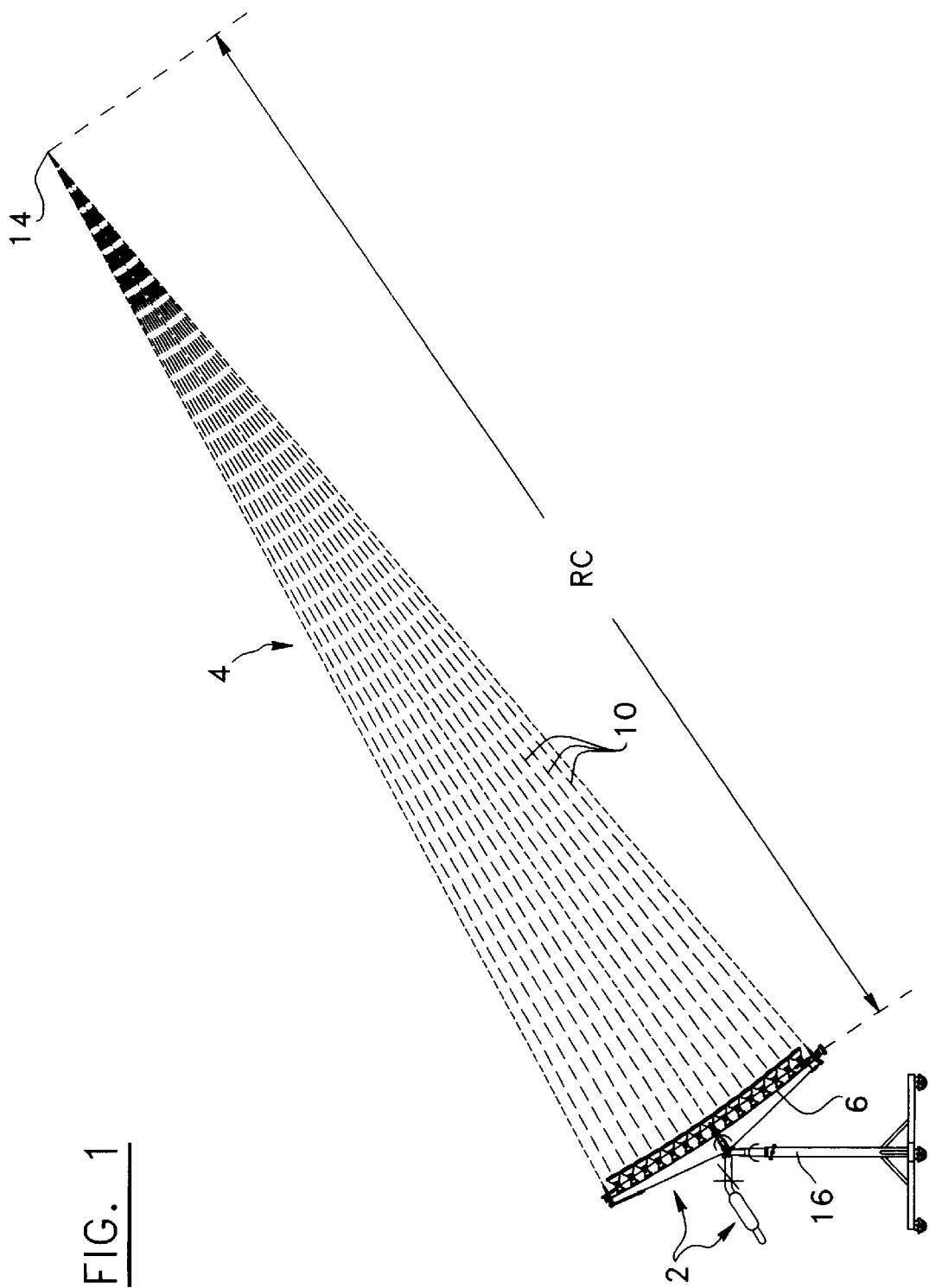
FIG. 1 is a side view of an apparatus according to the present invention.
Figure 2:
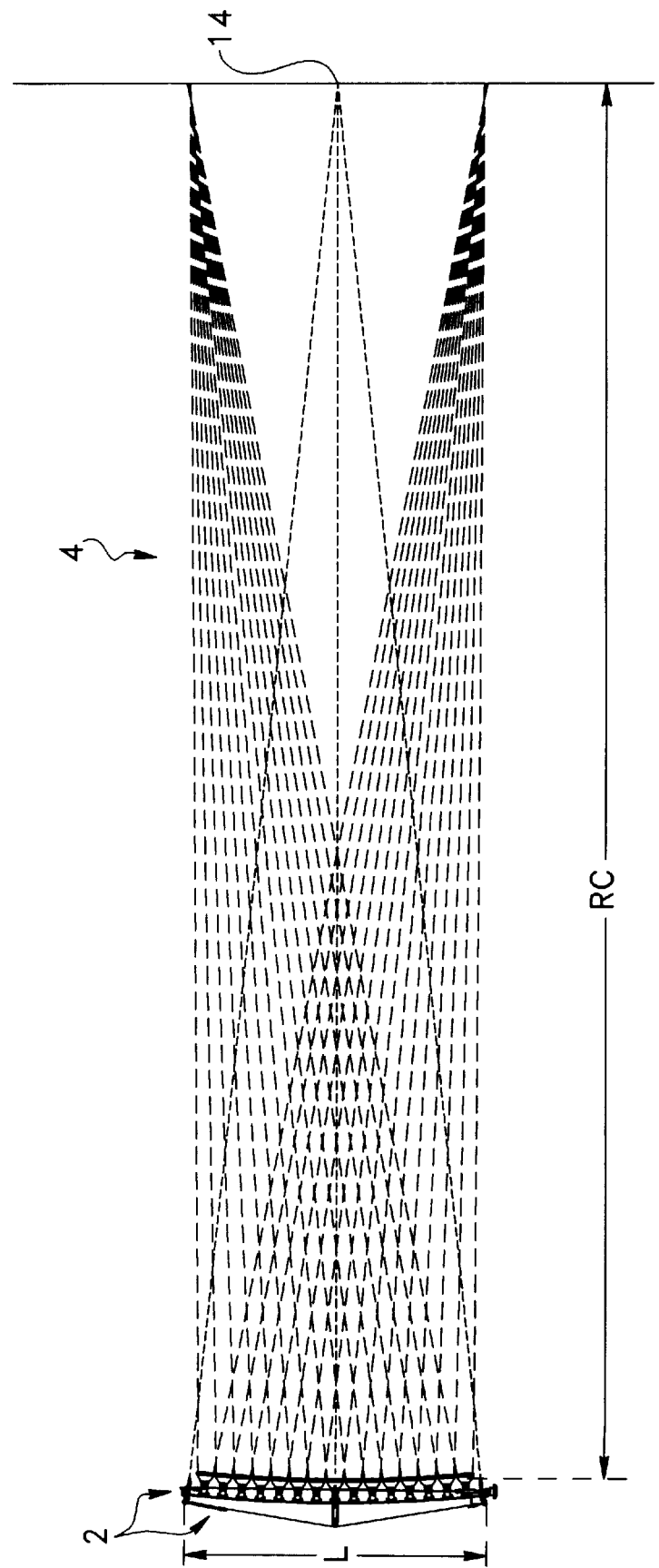
FIG. 2 is a partial side view of the apparatus shown in FIG. 1, which shows the spreading of the light.
Figure 3:
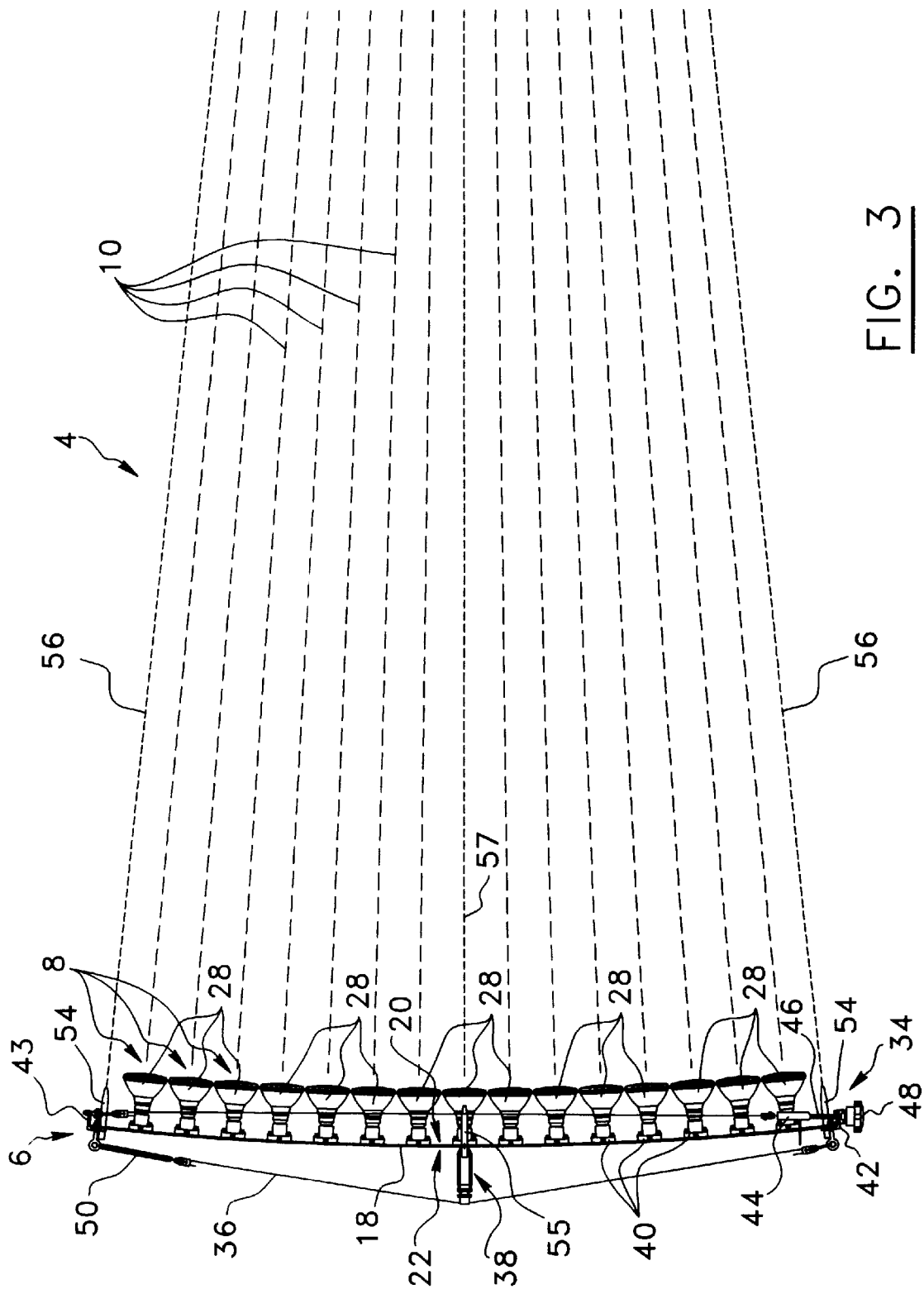
FIG. 3 is an enlarged view of a portion of what is shown in FIG. 2.

Referring now to FIGS. 1 to 3, one can see a side view of an apparatus 2 for heating at a distance by light radiance 4 according to the present invention. The apparatus comprises a support, and narrow-beam lamps 8 mounted on the support. Each of the lamps 8 is able to produce a luminous beam having a central axis 10 of projection. The apparatus also comprises a converging device cooperating with the support and the lamps 8 to orientate the lamps 8 so as to make the central axes 10 of the luminous beams converge towards a focal area 14 in order to heat an object (not shown). The converging device will be described in greater detail in reference to FIG. 3. The central axes 10 of the luminous beams produced by the lamps 8 converge at a distance RC so as to produce an intense energy flux to heat the object. An adjustable support 16 allows to direct the flux towards the desired location.

According to a preferred embodiment of the invention, the support preferably comprises a flexible plate 18 having opposite surfaces 20, 22. The lamps 8 are disposed on the surface 20 in at least one row. Preferably, the lamps 8 are disposed on the surface 20 in a matrix of lines and columns as shown in FIG. 10.

The projection of light produced by the apparatus 2 illustrated on this FIG. 1 only shows the central axes 10 of projection of the luminous beams produced by the lamps 8. A representation of the luminous beams will be explained in reference to FIG. 2. Nevertheless, this FIG. 1 allows to show that the central axes 10 of projection of the luminous beams come to converge towards the focal area 14 at a distance RC of the apparatus 2 in order to produce an intense energy flux.

Referring now to FIG. 2, one can see the luminous beams which constitute the projection of light. The critical radius $RC=L/(2 \tan(\theta/2))$ where L is the length of the matrix of lamps 8 as shown in FIG. 10, and $\theta$ is the opening angle of each of the light bulbs that contains the matrix of lamps 8. As an example only, if we set the length L as being equal to 1.895 m and that the opening angle of each light bulb of each lamp is 11.5° then the critical radius will be 9.4 m. The area active to the critical radius SAC, that is, the surface effectively lit will be equal to $(1.895/2)^2 * \pi = 2.82$ m$^2$. In the present case, the power of the matrix PM, that is, the power released by the set of light bulbs is 12 kW and the power density at the source FS is thus 12 kW/(length of the matrix*width of the matrix). For a matrix width of 1.01 m, the power density at the source FS is 6.26 kW/m$^2$.

Figure 11:
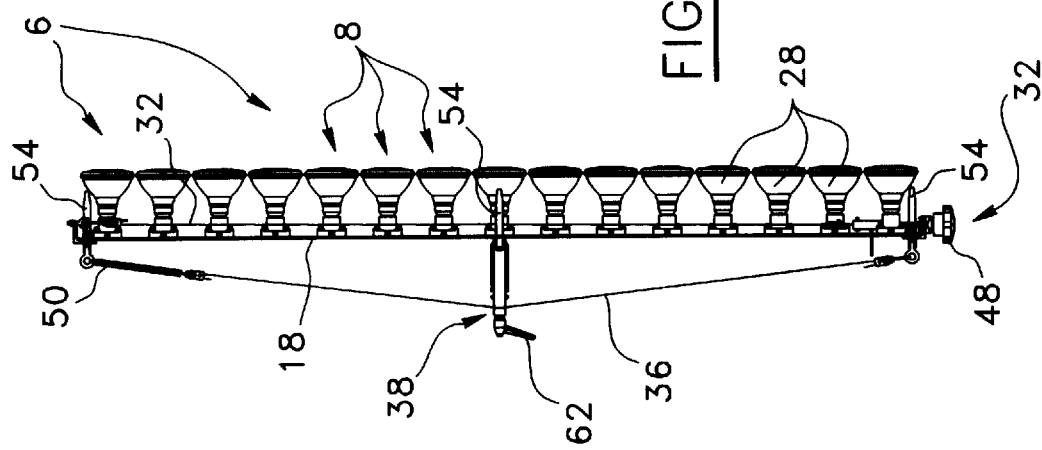
FIG. 11 is a side view of what is shown in FIG. 10.
Figure 10:
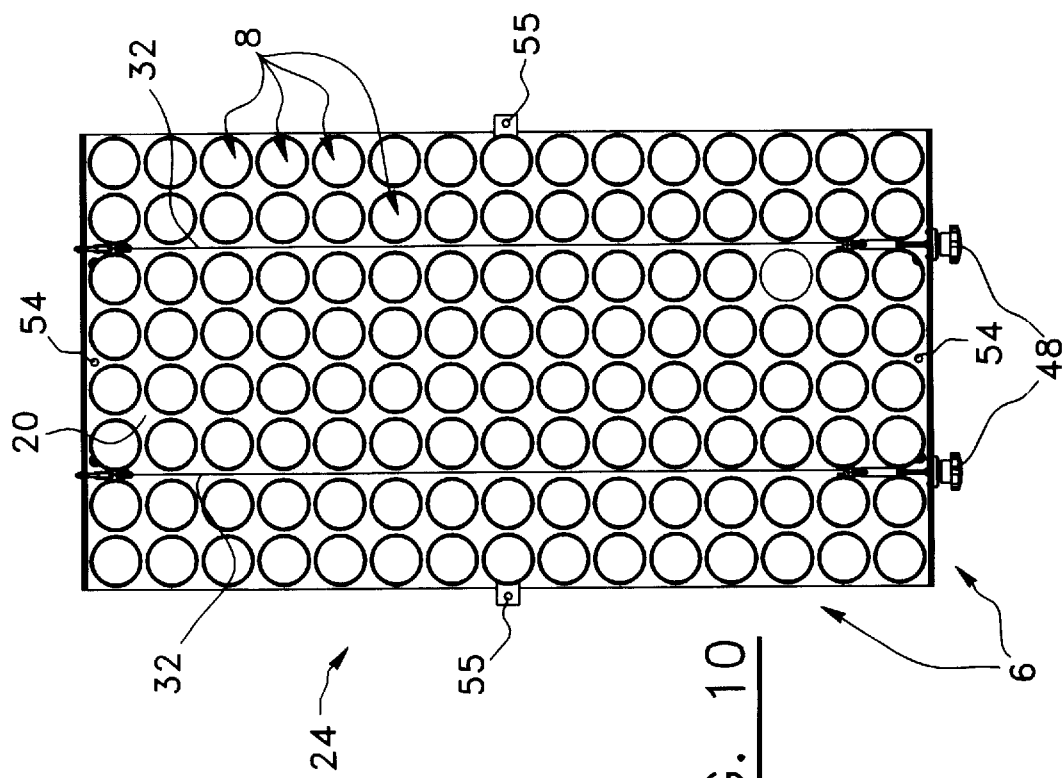
FIG. 10 is a front view of what is shown in FIGS. 2 and 3.

Referring now to FIGS. 3, 10 and 11, the support of lamps preferably comprises a flexible plate 18 having opposite surfaces 20, 22. Preferably, the lamps 8 are disposed on the surface 20 in a matrix of lines and columns (shown in FIG. 10). The converging device allows to modify the curvature of the flexible plate 18 so as to thus make the central axes 10 of the luminous beams produced by the lamps 8 converge in order to heat an object (not shown). The converging device comprises at least one tension cable 32, a tensioning device 34, at least one pair of parallel stabilization cables 36, a clamping device 38, and adjustment elements which will be described in greater detail in reference to FIGS. 8 and 9.

Preferably, the converging device comprises two tension cables 32, each tension cable 32 extending along the surface 20 in parallel to the columns of lamps 8 and having opposite ends fixed to the plate 18, as better shown in FIGS. 10 and 11. The tensioning device 34 is used to tension each tension cable 32 and thus bend the plate 18 so that the surface 20 of the plate 18 takes a concave shape to make the central axes 10 of the luminous beams of the lamps 8 of each of the columns converge towards a focal area.

Preferably, the tensioning device 34 comprises an L-shaped element 42 having a first wing fixed to the plate 18 and a second wing provided with a hole; a rod 44 having a first end fixed to one of the ends of the tension cable 32 and a second end comprising a threaded cavity; and a screw 46 passing through the hole of the second wing, the screw 46 having a first end cooperating with the threaded cavity of the rod 44 and a second end provided with a handle 48 resting against the second wing. The handle 48 allows a user to screw the screw 46 in the threaded cavity to thus adjust the tension in the tension cable 32 so as to bend the plate 18. The other end of the tension cable 32 is fixed to the plate by means of another L-shaped element 43.

Figure 13:
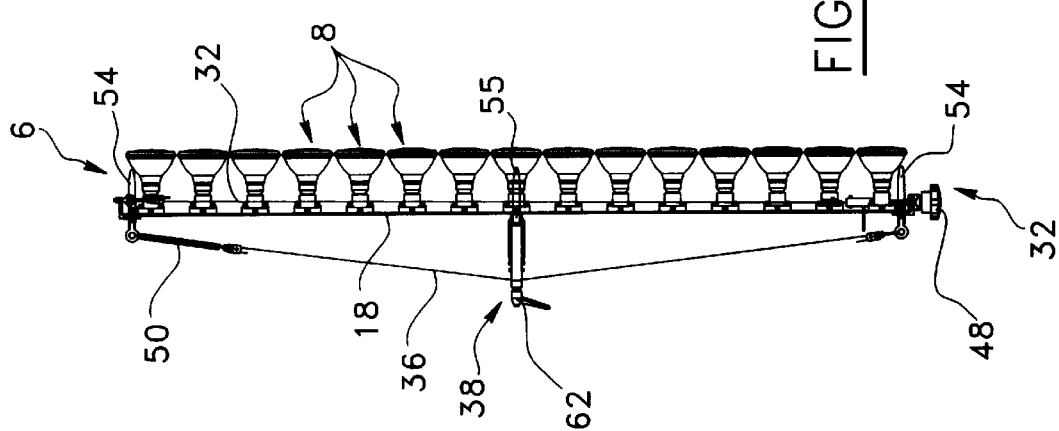
FIG. 13 is a side view of what is shown in FIG. 12.
Figure 12:
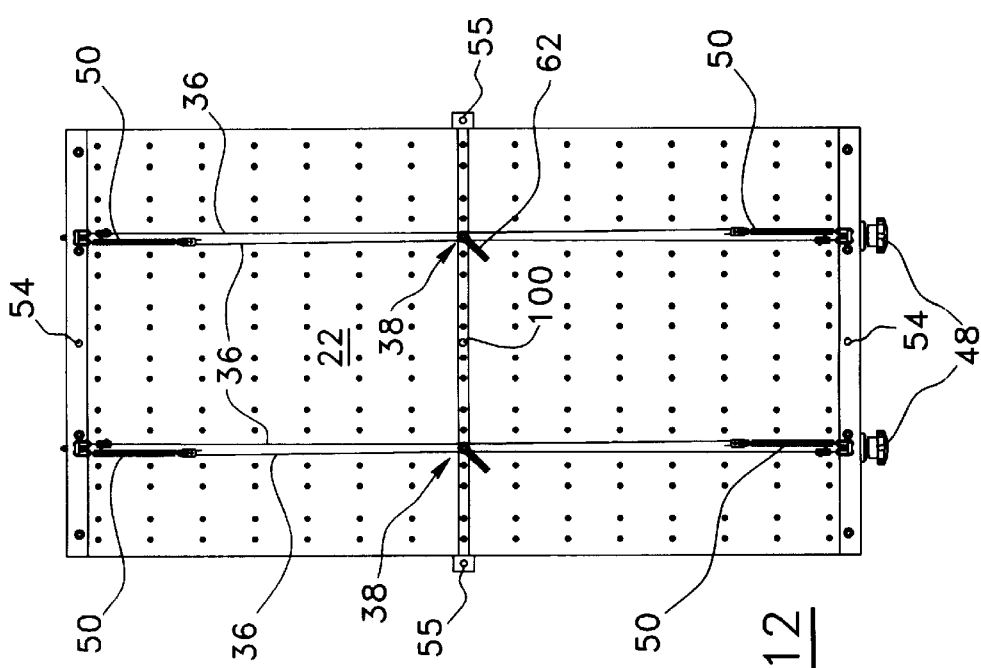
FIG. 12 is a rear view of what is shown in FIG. 10.

Referring now to FIGS. 3, 12 and 13, preferably, the converging device also comprises two pairs of parallel stabilization cables 36 extending along the surface 22 in parallel to the columns of lamps 8. Each of the cables 36 has a first end provided with a spring 50 fixed to the plate 18 and a second end also fixed to the plate 18. Clamping devices 36 are provided to clamp a section of each cable 36 with respect to the plate 18 so as to stabilize the concave shape of the surface 20. The springs 50 of each pair of stabilization cables 36 are located on both sides of the corresponding clamping device 38.

Figure 8:
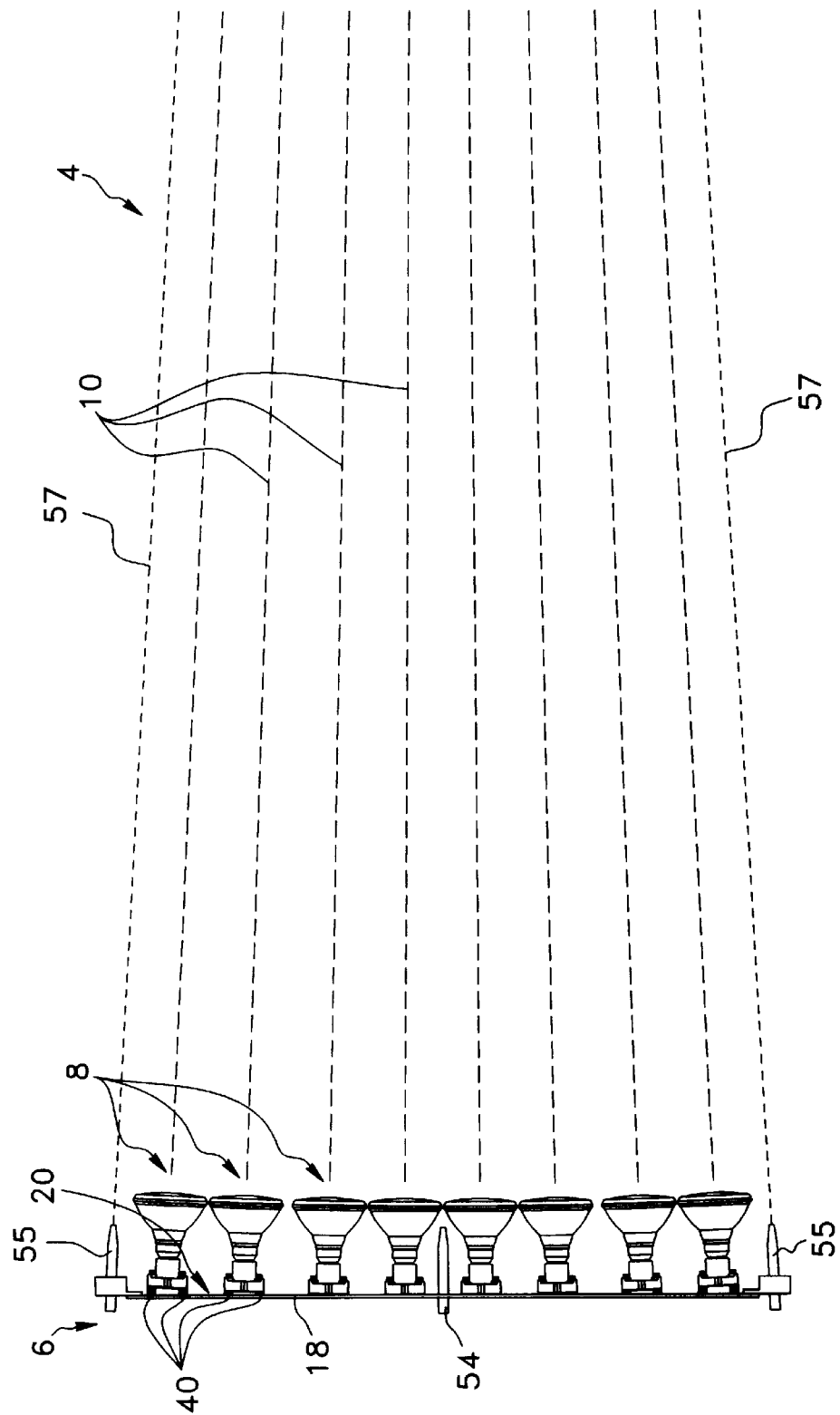
FIG. 8 is a top view of what is shown in FIG. 3.

Referring now to FIGS. 3, 8 and 9, preferably, a first pair of lasers 54 is provided to determine at which distance is located the focal area 14 shown in FIGS. 1 and 2 without having to turn on the matrix of lamps 8 while an operator is adjusting the degree of curvature of the flexible plate 18. More specifically, the first pair of lasers 54 is mounted on the plate 18 so as to be aligned in parallel to the columns of lamps 8 and able to produce laser beams 56 oriented in the same way as the central axes 10 of projection of the beams of the lamps 8 of the columns so as to allow to determine by a convergence of the laser beams 56 the distance between the first focal area 14 and the apparatus 2.

Preferably also, a second pair of lasers 55 is mounted on the plate 18 so as to be aligned in parallel to the lines of lamps 8 and able to produce laser beams 57 oriented in the same way as the central axes 10 of projection of the luminous beams of the lamps 8 of the lines so as to allow to determine by a convergence of the laser beams 57 produced by the second pair of lasers 55 the distance between a second focal area and the apparatus 2, so as to be able to heat at a distance by light radiance 4 according to two modes of convergence.

Figure 4:
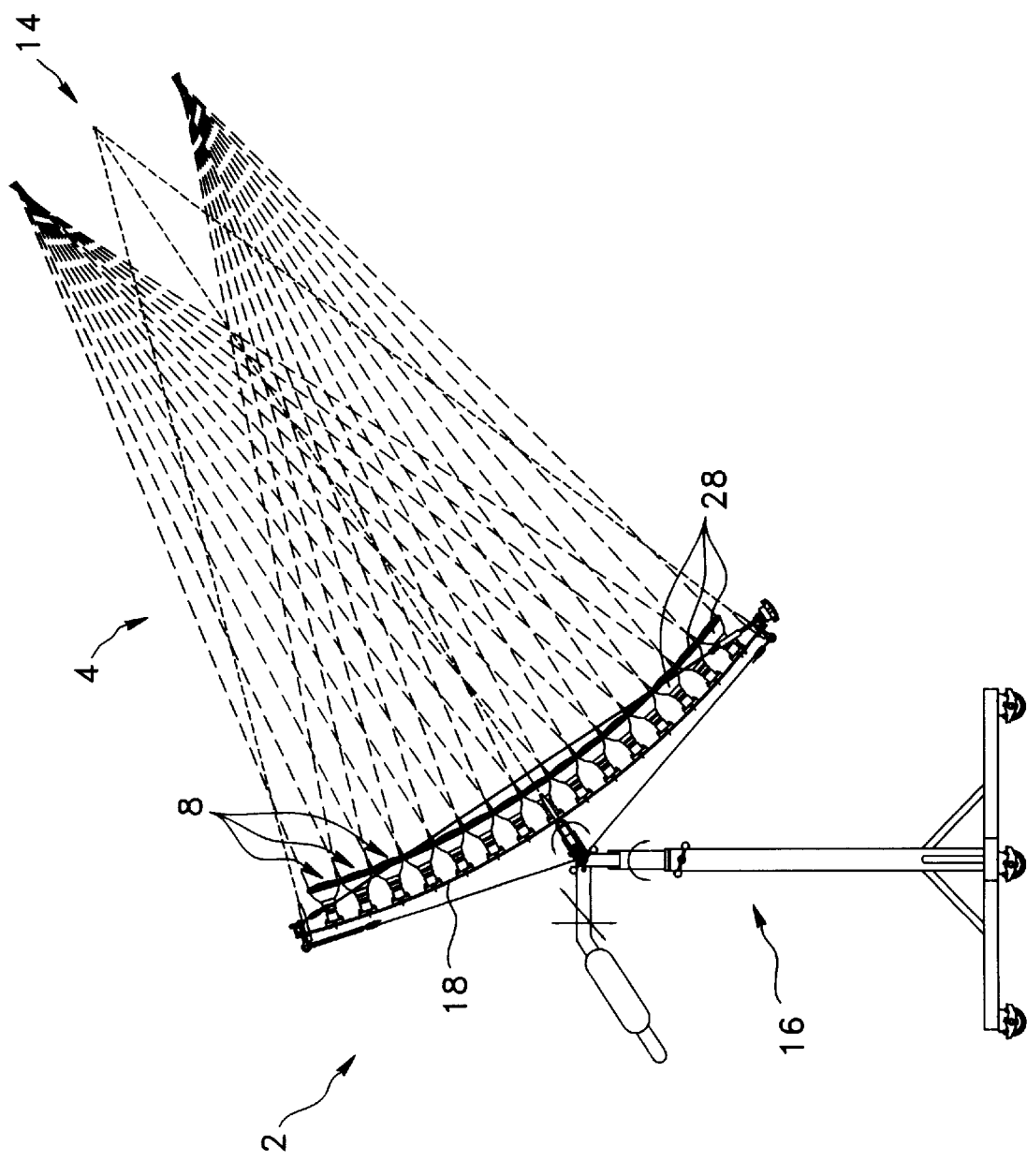
FIG. 4 is a side view of the apparatus shown in FIG. 1 in another operating position.

Referring now to FIG. 4, the apparatus 2 is shown in an extreme operating position, that is, the curvature of the flexible plate 18 is at its maximum and one obtains in the present case a minimal focal distance FM. This extreme position is determined by the distance between the lamps 8 and by the dimension of the lamps 8. As can be seen in this FIG. 4 and also in FIG. 5 which is an enlarged representation of a portion of what is shown in FIG. 4, the external circumference of the light bulbs 28 touch each other therefore it is not possible to further bend the flexible plate 18.

Figure 5:
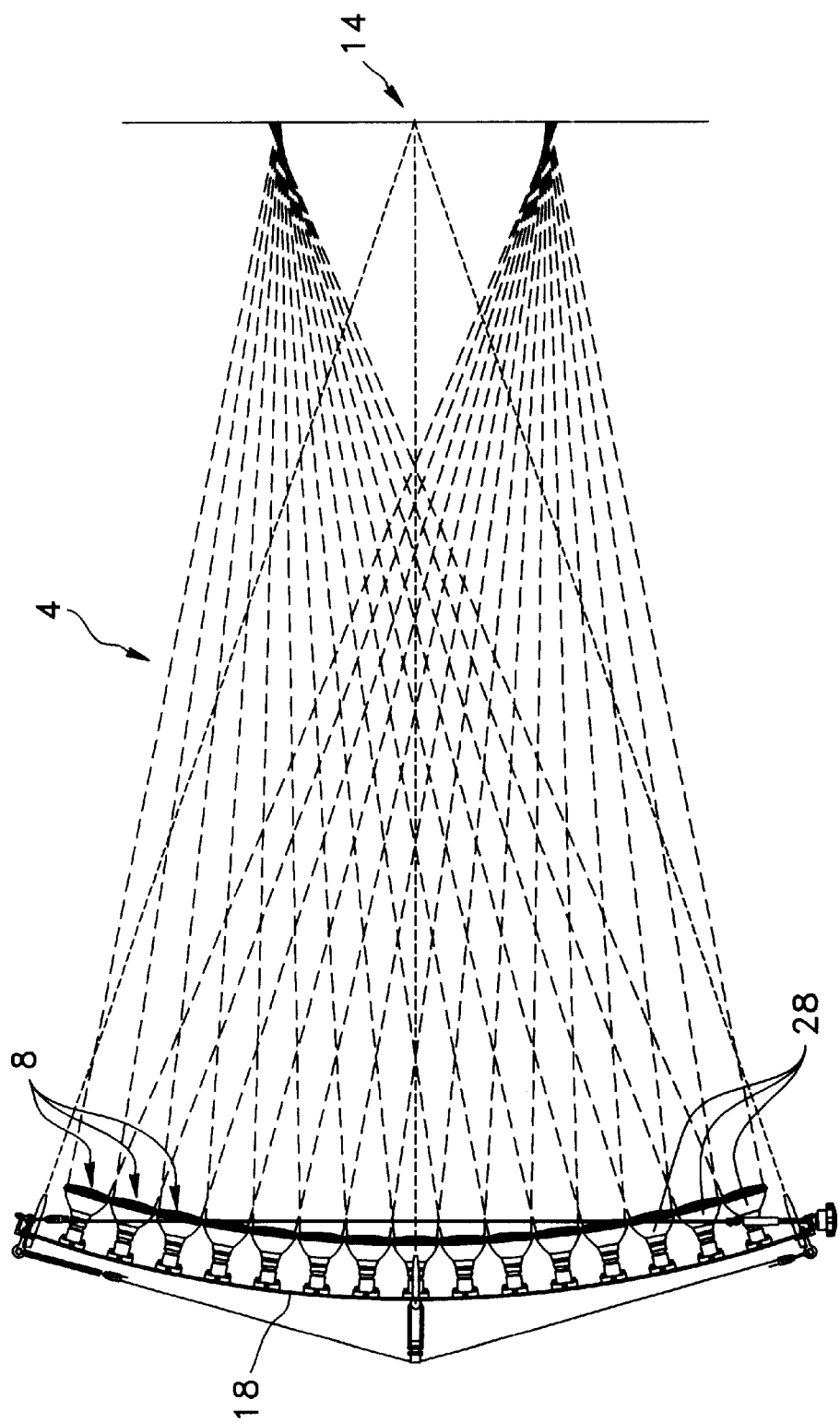
FIG. 5 is an enlarged view of a portion of what is shown in FIG. 4.
Figure 6:
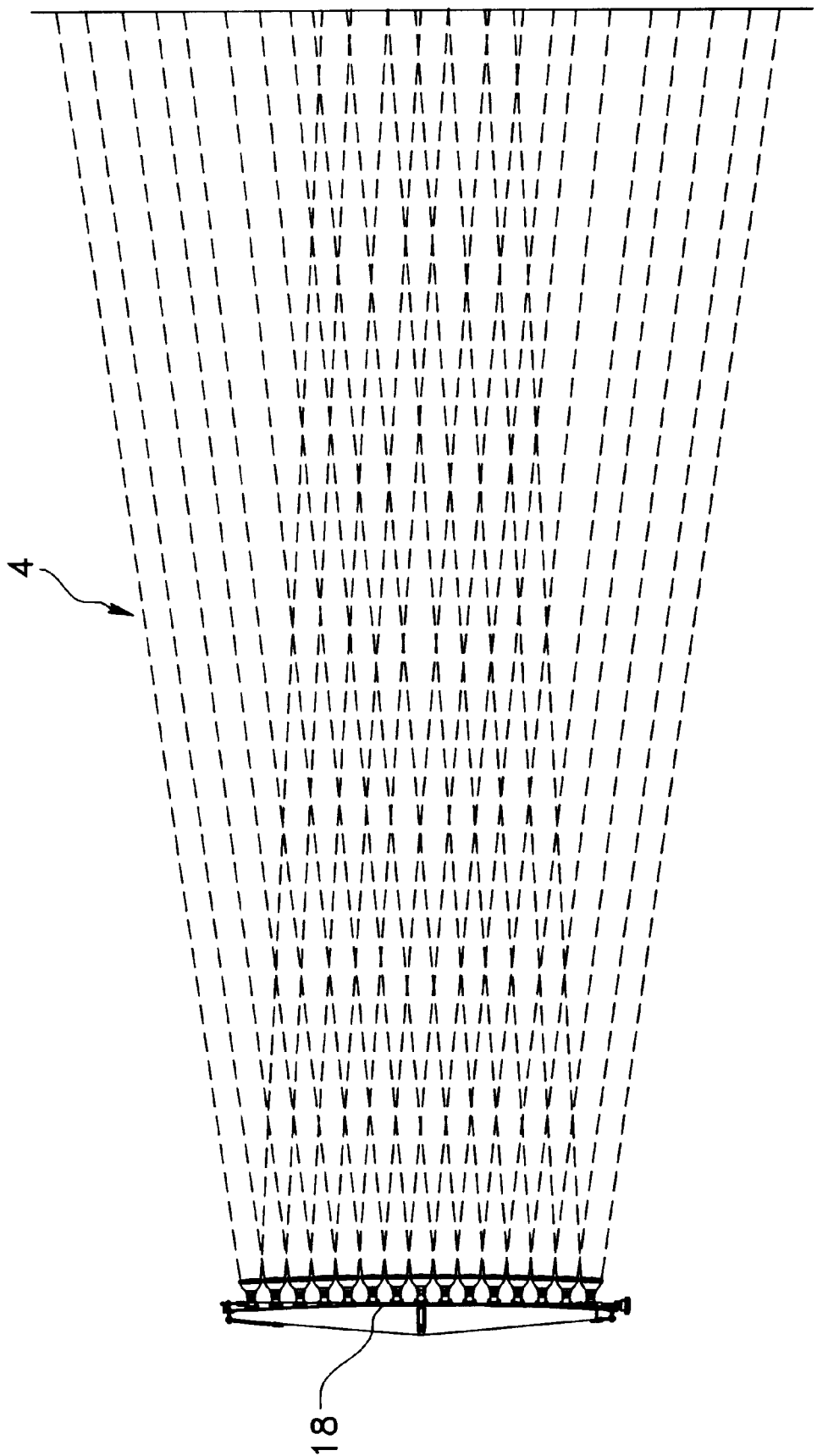
FIG. 6 is a view of what is shown in FIG. 5 in another operating position.
Figure 7:
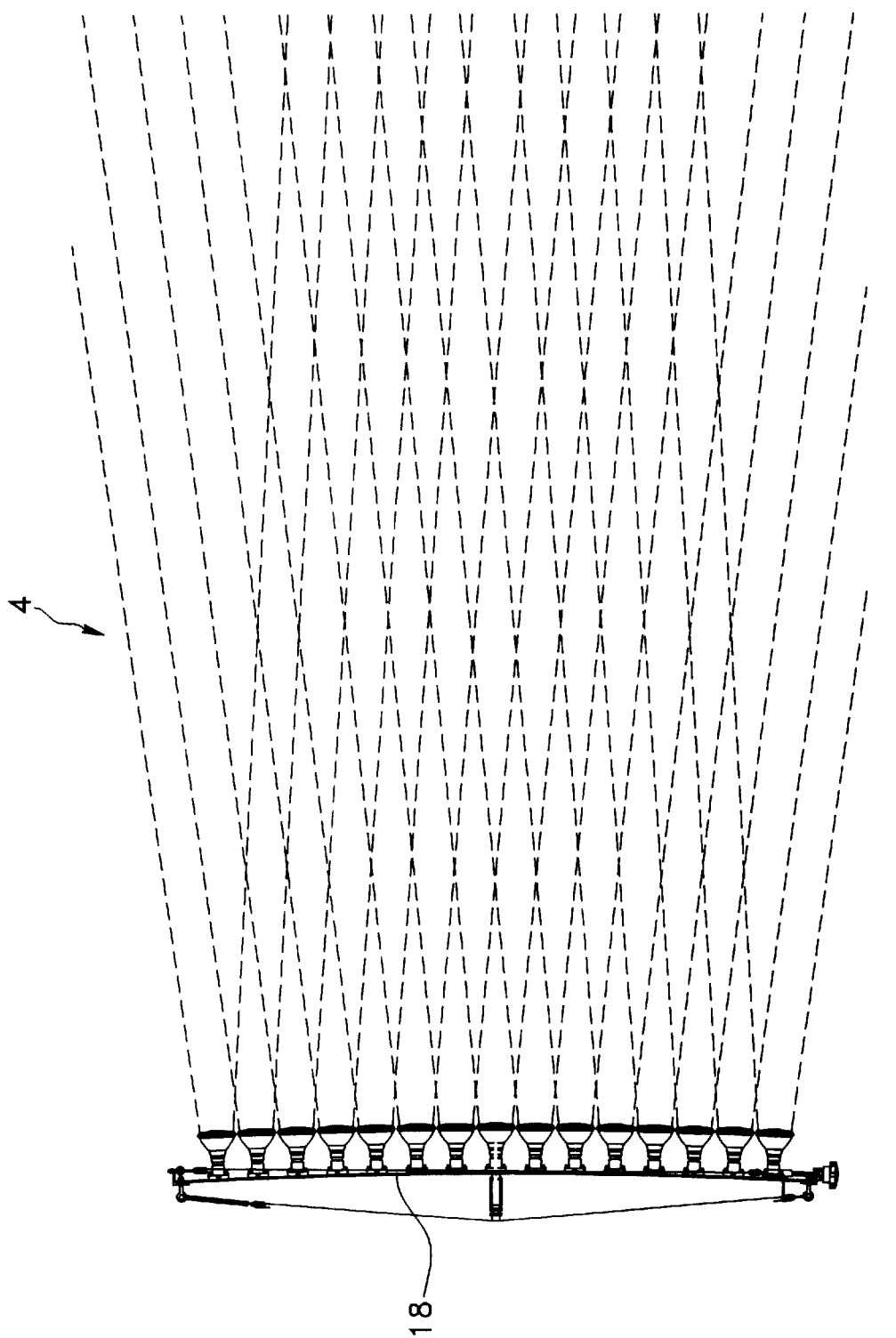
FIG. 7 is an enlarged view of a portion of what is shown in FIG. 6.

Referring now to FIGS. 6 and 7, one can see another operating position of the apparatus 2 where the flexible plate 18 is bent according to an opposite direction of what is shown in FIGS. 4 and 5, this allows to diverge the light. This type of operating position is useful when one wants to produce a lighting for example.

Referring now to FIGS. 8 and 9, preferably, adjustment elements 40 are mounted between the lamps 8 and the plate 18 to orientate said lamps 8 of each of the lines of the matrix with respect to the surface 20 of the plate 18 so as to make the central axes 10 of the luminous beams of the lamps 8 of each line converge towards the second focal area different to the one shown in FIGS. 1 and 2.

The convergence of the central axes 10 of the luminous beams of the lamps 8 of each line towards the second focal area is not produced by a curvature of the flexible plate 18 but rather by adjustment elements 40 which allow to orientate the lamps 8 of each of the lines with respect to the surface 20 of the flexible plate 18. The adjustment elements 40 comprise rings 40 removably mounted between each lamp 8 and the surface 20 of the support of lamps. As can be seen, the lamps 8 located at the center of the plate 18 are mounted directly on the flexible plate 18 without adjustment rings 40. For each line of lamps, as we move towards the periphery, there is more adjustment rings 40 which are used to orientate the direction of projection of each lamp 8. It is thus easy to see that the distance between the second focal area and the matrix of lamps 8 cannot be adjusted easily during use of the apparatus 2 since it is fixed in advance during the mounting of the lamps 8 on the flexible plate 18. This focalization distance is set beforehand to the desired critical radius RC.

Figure 14:
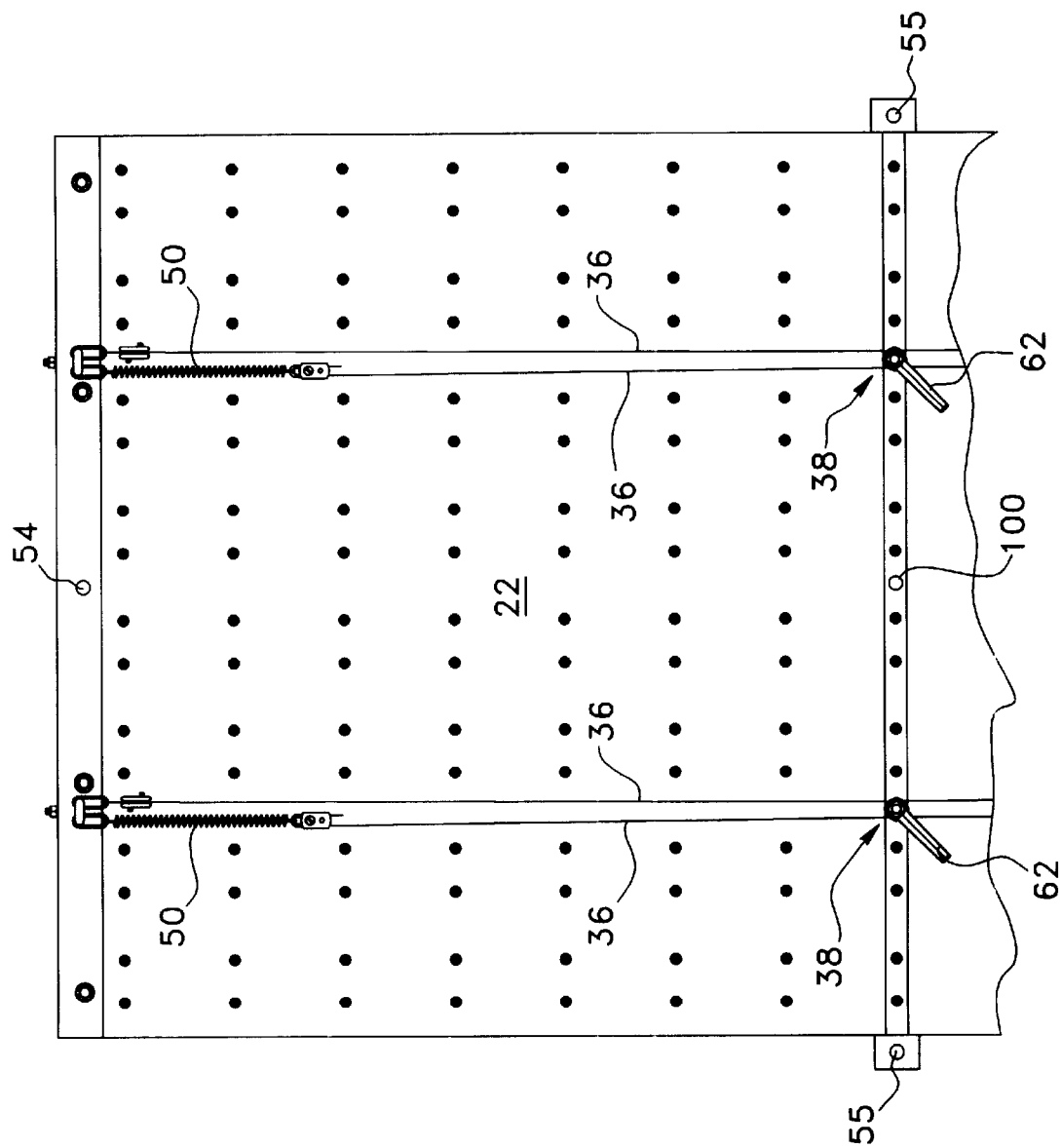
FIG. 14 is an enlarged view of a portion of what is shown in FIG. 12.
Figure 15:
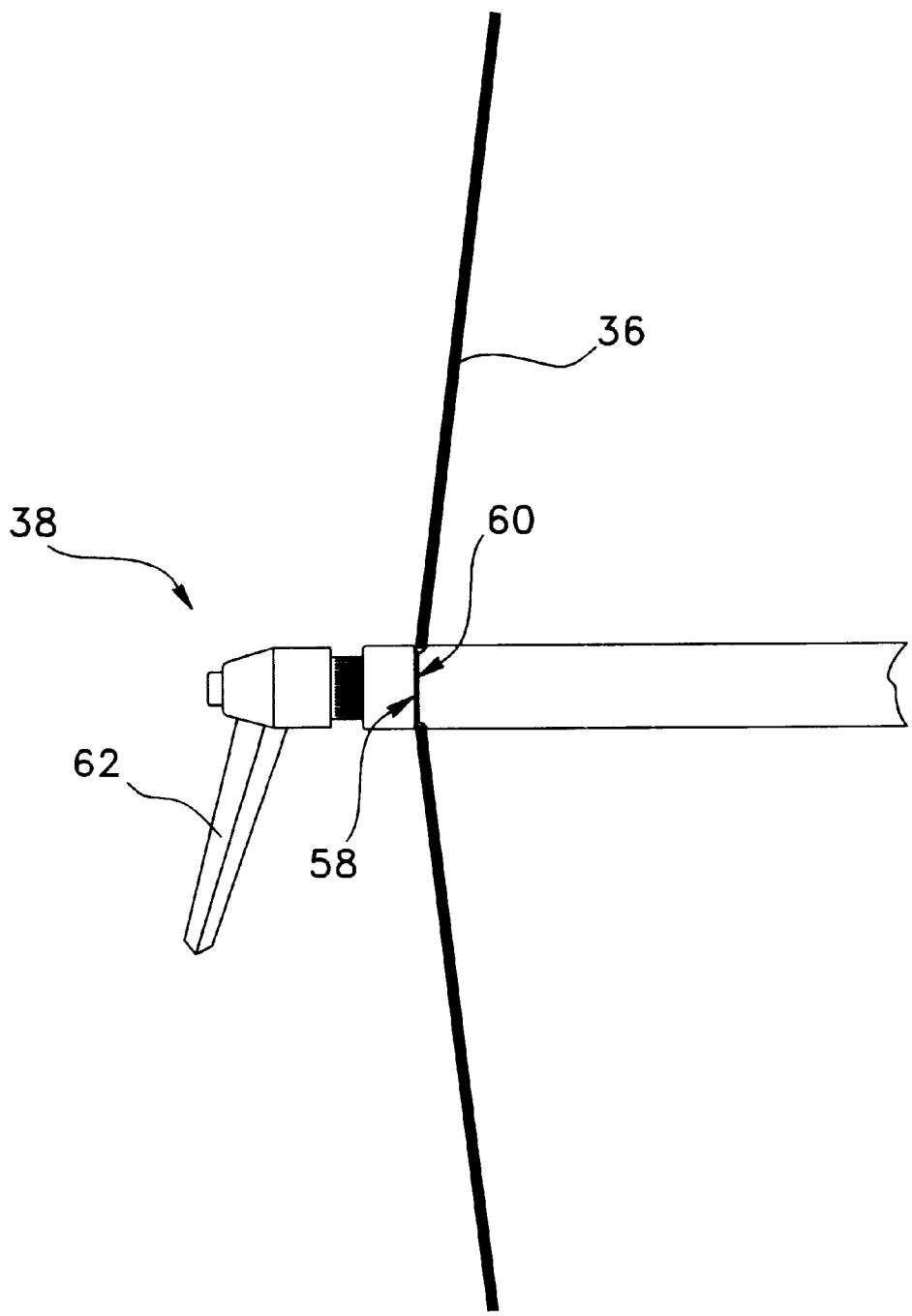
FIG. 15 is an enlarged view of a portion of what is shown in FIG. 13.

Referring now to FIGS. 14 and 15, one can see that the clamping devices 38 are mounted on the surface 22 of the plate. Each clamping device 38 comprises a female jaw 58, a male jaw 60 screwed into the female jaw 58 and a handle 62 for tightening the stabilization cables 36 between the male and female jaws 60, 58 by screwing said jaws 60, 58 towards one another. The handles 62 allow to immobilize the cables 36. There is thus on both sides of each clamping device a springless section of stabilization cable 36 which fixes the flexible plate 18 in a stable position according to a given curvature.

Referring now to FIGS. 1 to 3 and 10 to 15, we will explain how the operator can adjust the curvature of the flexible plate 18 to modify the distance at which the focal area 14 is located from the apparatus 2. Firstly, with the help of the handles 48 of the tensioning devices 34, the operator adjusts the degree of curvature of the plate 18 by screwing each screw 46 in the threaded cavity of the corresponding rod 44 so as to thus tension each tension cable 32 with more or less force. The tension in each tension cable 32 forces the plate 18 to bend according to a concave shape and the stabilization cables 36 adjust themselves consequently in length given the fact that each one of them possesses a spring 50. According to an operating mode, the lasers 54 are firstly activated to allow to the operator to see by a convergence of laser beams 56 where the focal area 14 is located. Then, when the focal area 14 is located at the desired distance, each stabilization cable 36 is immobilized between the corresponding male and female jaws 60, 58 with the help of the handles 62.

As better illustrated in FIGS. 14 and 15, there is on both sides of each handle 62 a section of cable 36 which is springless. Once immobilized, each pair of stabilization cable 36 thereby impedes the plate 18 to further bend and the tension cables 32 impede the plate 18 to straighten up. Thus, this system of tension and stabilization cables 32, 36 allows to fix the plate 18 in a stable position according to a given curvature.

Figure 16:
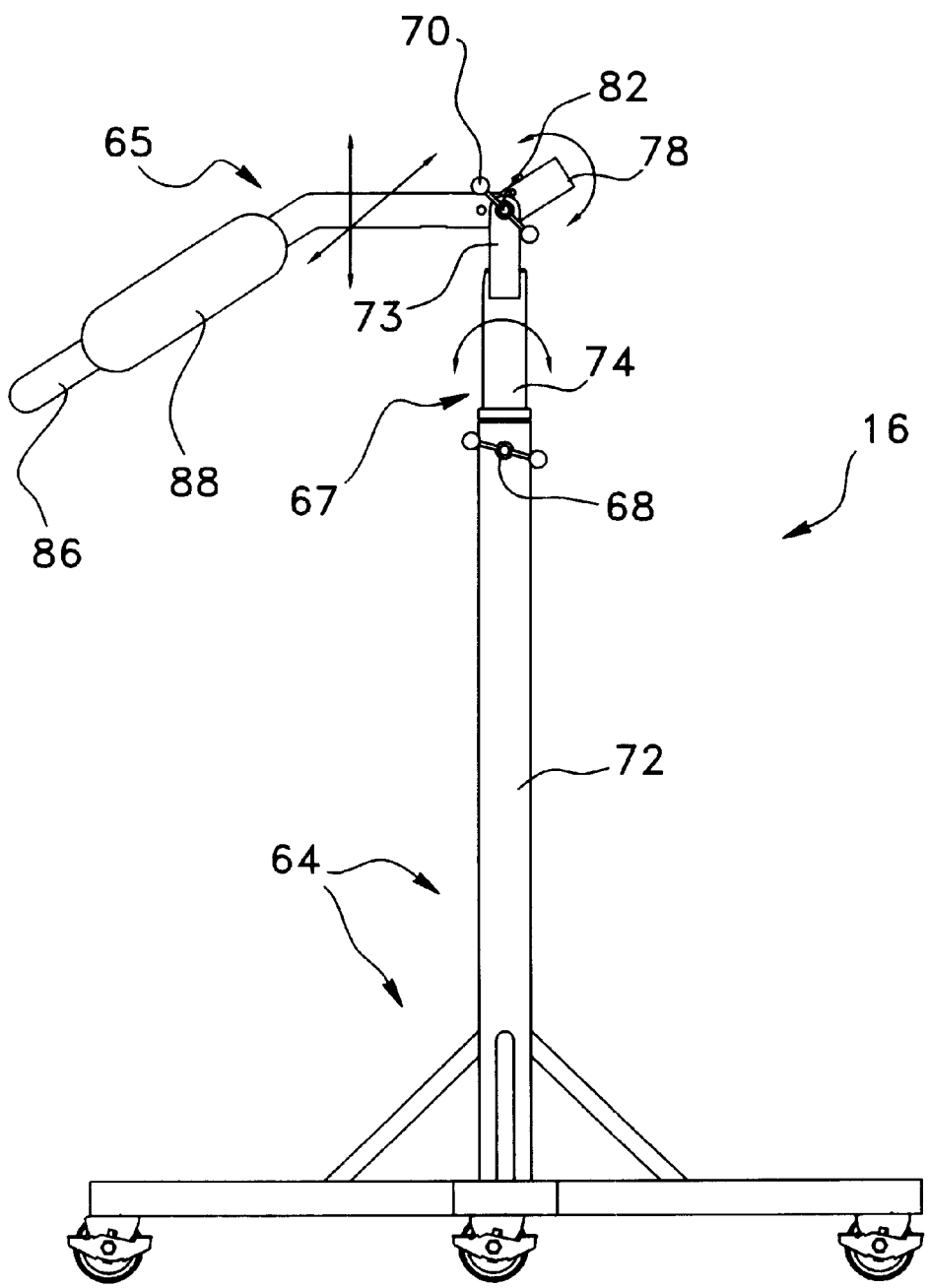
FIG. 16 is an enlarged view of a portion of what is shown in FIG. 1.

Referring now to FIG. 16, one can see the adjustable support 16 which supports the light panel 6 shown in FIG. 1 for example. The adjustable support 16 comprises a base 64, a hinged device having two parts 65, 67 and two locking devices 68, 70. The base 64 is mounted on wheels and comprises a cylindrical member 72. The hinged device comprises a first part 67 having a first cylindrical end 74 able to slide with respect to the cylindrical member 72 of the base 64. The hinged device also comprises another part 65 having a cylindrical end 78 able to receive a cylindrical connection element 100 of the support of lamps shown in FIGS. 12 and 14, an intermediate part connected to a second end 73 of the first part 67 through a pivot axis 82, and a second end provided with a handle 86 and a counterweight 88.

The locking device 68 serves to lock the first end 74 with respect to the cylindrical member 72 of the base 64. The locking device 70 serves to lock the first part 67 with respect to the second part 65 of the hinged device via the pivot axis 82.

This adjustable support 16 allows to pivot the panel according to three given directions, that is to say that one can direct the panel of lamps in any given direction and the counterweight 88 allows the user to easily manipulate the panel. The adjustable support 16 can be oriented manually or could also be oriented in a motorized manner, so as to be able to operate it from a distance.

Figure 17:
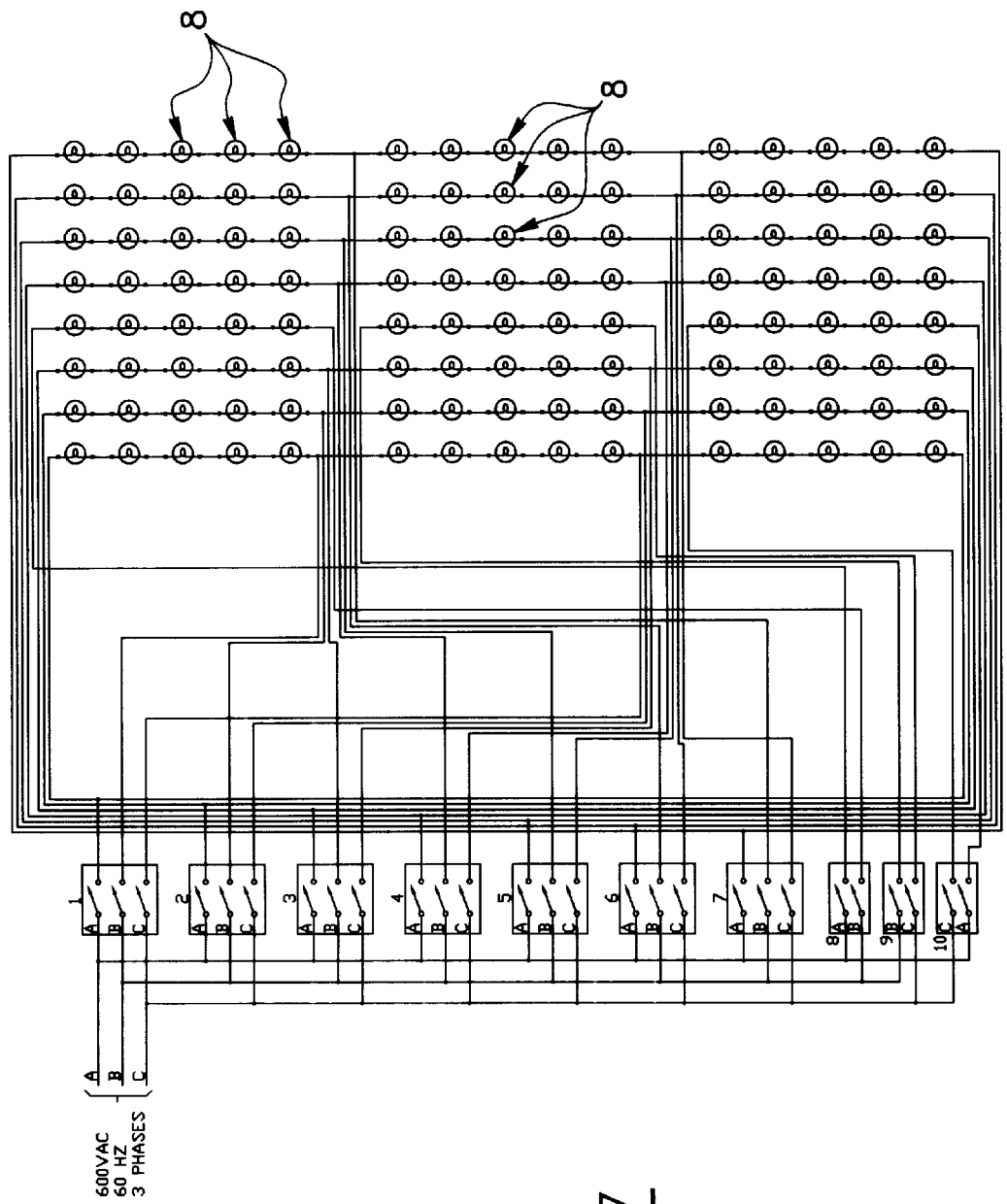
FIG. 17 is an electric diagram of an apparatus according to the present invention.

Referring now to FIG. 17, one sees an electrical diagram which shows how the lamps 8 are plugged to the supply. One could also use a separate switching device to activate certain lamps 8 of the matrix so as to be able to localize the patch of light projected by the panel before turning on the whole matrix of lamps 8. Furthermore, as mentioned earlier, an independent system of highly narrow-beam lamps or lasers can be used to be able to adjust the matrix of lamps 8 and localize the patch of light before turning on the whole set of lamps 8 of the matrix.

Figure 19:
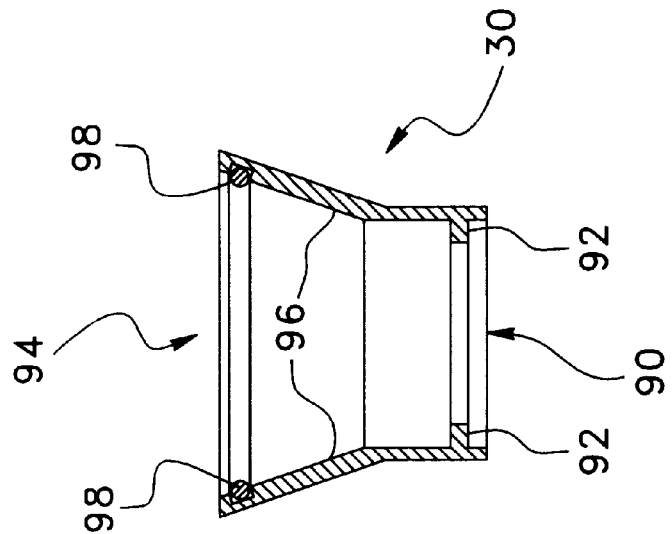
FIG. 19 is a cross-sectional view of one of the elements shown in FIG. 18.
Figure 18:
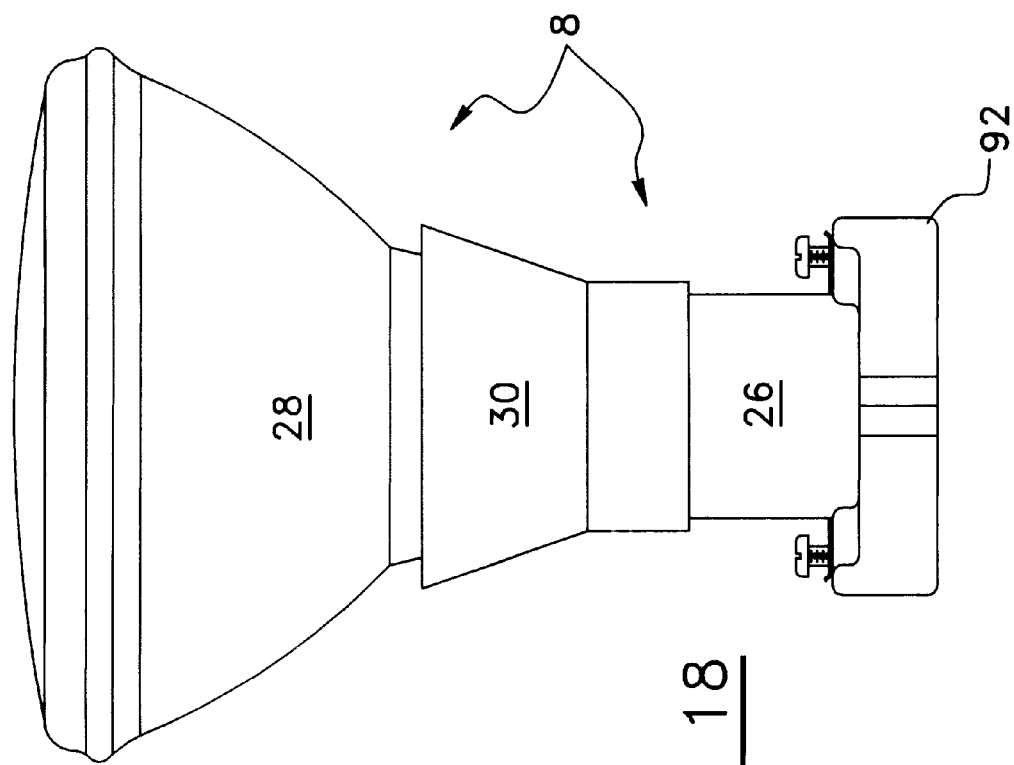
FIG. 18 is a side view of a light bulb screwed into a socket according to the present invention.

Referring now to FIGS. 18 and 19, one can see that each lamp 8 comprises a socket 26, a light bulb 28 screwed into the socket 26 and a tubular body 30.

The tubular body 30 has a cylindrical end 90 provided with an abutment 92 able to cooperate with the corresponding socket 26, and a splayed end 94 having an internal wall 96 provided with a peripheral ring 98, the internal wall 96 being able to receive the light bulb 28. The tubular body 30 serves to align the light bulb 28 with respect to the socket 26.

As an example only, the apparatus 2 according to the preferred embodiment shown in FIGS. 1 to 19 is characterized in the following way. The density of the theoretical power, assuming that there is no loss of energy, at the critical radius FRC is equal to 4.25 kW/m$^2$. The voltage for operating the matrix 24 VM is 600 V. The cost of electric operation C of the matrix 24 is 0.75$/hour for 1 kW•hour= 0.05$. The number of lamps 8 along the length of the matrix is 15 and along the width of the matrix is 8. The opening angle of each light bulb 28 is characterized by the angle θ which is 11.5°. The power of each lamp 8 PL is 100 W and the voltage of each lamp 8 PL is 120 V. By choosing light bulbs 28 with smaller opening angles one can increase the critical radius RC shown in FIG. 1.

According to the present invention, there is also provided a method for heating at a distance by light radiance. To describe this method, we will refer to FIGS. 1 to 3. The method comprises the steps of activating narrow-beam lamps 8 mounted on the support of lamps, each of the lamps 8 being able to produce a luminous beam having a central axis 10 of projection, and orienting the lamps 8 by means of the support of lamps so as to make the central axes 10 of the luminous beams produced by the lamps 8 converge towards a first focal area in order to heat an object.

Referring now to FIGS. 1 to 3, 10, 11, 12 and 13, according to a preferred embodiment, the step of orienting comprises the following steps (a) tensioning the tension cables 32, and (b) blocking a section of each of the stabilization cables 36 with respect to the plate 18 to thus stabilize the concave shape of the first surface 20. Preferably, this preferred embodiment can also further comprise the step of activating the two lasers 54 mounted on the flexible plate 18 so as to allow to determine by a convergence of the laser beams 56 the distance between the focal area 14 and the support of lamps.

Referring now to FIGS. 8 and 9, the step of orienting can also comprise the step of mounting the lamps 8 on the surface 20 of the support of lamps by disposing adjustment elements 40 between the lamps 8 and the surface 20 of the support of lamps so as to make the central axes 10 of the luminous beams converge towards a second focal area.

Referring now to FIGS. 3, 8 and 9, preferably, another preferred embodiment further comprises the steps of activating the pair of lasers 54 mounted on the flexible plate 18 to produce laser beams 56 oriented in the same way as the central axes 10 of projection of the luminous beams of the lamps 8 of the columns so as to allow to determine by a convergence of the laser beams 56 the distance between a first focal area and the support of lamps; and activating a second pair of lasers 55 mounted on the flexible plate 18 to produce laser beams 57 oriented in the same way as the central axes 10 of projection of the luminous beams of the lamps 8 of the lines so as to allow to determine by a convergence of the laser beams 55 the distance between the second focal area and the support of lamps.

The present invention presents several advantages over the prior art and can be used in different ways. The present invention allows among other things but not exclusively to defrost, deice or heat objects, installations or people being exposed to cold exterior temperatures. Another advantage of the present invention is to allow to deice at a distance without mechanical or electrical contact electrically charged equipment parts of transportation or power lines like section switches for example. Another advantage of the present invention is to allow to deice from ground level electrically or non-electrically charged equipment parts of transportation or power lines, located high above, for example transformers, control switches, a transmission tower or even a communication tower. Another advantage of the present invention is to deice at a distance without compromising personnel security with respect to possible ice falls or the electric voltage.

Furthermore, the present invention also allows to preheat an equipment part such as a control switch during cold weather before carrying out any work. The present invention also allows to heat the personnel working outside during work carried out in cold weather. The present invention also allows to impede the formation of ice or to defrost electrical crosspieces of sulphur hexafluoride distribution posts or bushings. The present invention could also allow to break by differential expansion certain fragile materials like rocks for example.

Another advantage of the present invention is to allow to light up personnel during the completion of work carried out outside during the night. Another advantage of the present invention is to provide an apparatus 2 and a method for heating by light radiance 4, which can be operated with a small operating cost, a small maintenance cost, and a small purchasing cost. Another advantage of the present invention is to provide an apparatus for heating by light radiance, which is easy to maintain and which can be easily mounted on a service truck. The apparatus can also be mounted on a service truck and supplied by an auxiliary generator or supplied by a generator driven by the PTO of the transmission of the service truck.

Several apparatuses can be used together side by side to produce a focal area elongated according to an axis by focussing the beams of the different apparatuses at different adjacent distances along the axis.

Although a preferred embodiment of the invention has been described in detail herein and illustrated in the accompanying drawings, it is to be understood that the invention is not limited to this precise embodiment and that various changes and modifications may be effected therein without departing from scope or spirit of the invention.

What is claimed is:

1. An apparatus for heating at a distance by light radiance, comprising:

a support;

a plurality of narrow-beam lamps mounted on the support, each of the lamps being able to produce a luminous beam having a central axis of projection, the lamps being disposed on the support in a matrix of lines and columns;

first converging means cooperating with the support and the lamps of each column to orient said lamps of each column so that the central axes of the luminous beams thereof converge towards a first focal area; and second converging means comprising positioning elements mounted between the lamps of each line and the support to orient said lamps of each line with respect to the support so that the central axes of the luminous beams thereof converge towards a second focal area.

2. The apparatus according to claim 1, wherein:

the support comprises a flexible plate having first and second opposite surfaces; and the lamps are disposed on the first surface.

3. The apparatus according to claim 2, wherein the first converging means comprises:

a tension cable extending along the first surface in parallel to the columns of lamps, the tension cable having opposite ends fixed to the plate;

tensioning means for tensioning the tension cable and thus bending the plate so that the first surface takes a concave shape to orient said lamps of each column;

two parallel stabilization cables extending along the second surface in parallel to the columns of lamps, each of the stabilization cables having a first end provided with a spring fixed to the plate and a second end also fixed to the plate; and clamping means for clamping a section of each stabilization cable with respect to the plate so as to stabilize the concave shape of the first surface, the springs of the two stabilization cables being located on both sides of the clamping means.

4. The apparatus according to claim 3, wherein the tensioning means comprise:

an L-shaped element having a first wing fixed to the plate and a second wing provided with a hole;

a rod having a first end fixed to one of the ends of the tension cable and a second end comprising a threaded cavity; and a screw passing through the hole of the second wing, said screw having a first end cooperating with the threaded cavity of the rod and a second end provided with a handle resting against the second wing, said handle allowing a user to screw the screw in the threaded cavity to thus adjust the tension in the tension cable so as to bend the plate.

5. The apparatus according to claim 3, wherein the clamping means are mounted on the second surface of the plate and comprise a female jaw, a male jaw screwed into the female jaw and a handle for tightening the stabilization cables between the male and female jaws by screwing said jaws towards one another.

6. The apparatus according to claim 3, further comprising two lasers mounted on the plate so as to be aligned with one of the columns and able to produce laser beams oriented in the same way as the central axes of projection of the luminous beams of the lamps of said one column to allow determination, by a convergence of the laser beams, of the distance between the first focal area and the apparatus.

7. The apparatus according to claim 3, further comprising:

a first pair of lasers mounted on the plate so as to be aligned with one of the columns of lamps and able to produce laser beams oriented in the same way as the central axes of projection of the luminous beams of the lamps of said one column so as to allow determination by a convergence of the laser beams, of a distance between the first focal area and the apparatus; and a second pair of lasers mounted on the plate so as to be aligned with one of the lines of lamps and able to produce laser beams oriented in the same way as the central axes of projection of the luminous beams of the lamps of said one line to allow determination by a convergence of the laser beams produced by the second pair of lasers a distance between the second focal area and the apparatus.

8. The apparatus according to claim 2, further comprising two lasers mounted on the plate so as to be aligned with one of the columns and able to produce laser beams oriented in the same way as the central axes of projection of the luminous beams of the lamps of said one column to allow determination, by a convergence of the laser beams, of the distance between the first focal area and the apparatus.

9. The apparatus according to claim 1, wherein the positioning elements comprise rings removably mounted between each lamp and a surface of the support.

10. The apparatus according to claim 1, further comprising:

a base mounted on wheels and comprising a cylindrical member;

a hinged device comprising:

a first part having a first cylindrical end able to slide with respect to the cylindrical member of the base;

a second part having a first cylindrical end able to receive a cylindrical connection element of the support, an intermediate part connected to a second end of the first part through a pivot axis, and a second end provided with a handle and a counterweight;

a first locking means for locking the first end of the first part with respect to the cylindrical member of the base; and a second locking means for locking the first part with respect to the second part via the pivot axis.

11. The apparatus according to claim 1, wherein each lamp comprises a socket, a light bulb screwed into the socket, and a tubular body having a cylindrical end provided with an abutment able to cooperate with the corresponding socket, and a splayed end having an internal wall provided with a peripheral ring, the internal wall being able to receive the light bulb, the tubular body being used for aligning the light bulb with respect to the socket.

12. A method of heating at a distance by light radiance, comprising the following steps:

(a) activating a plurality of narrow-beam lamps mounted on a support in a matrix of lines and columns, each of the lamps being able to produce a luminous beam having a central axis of projection;

(b) orienting the lamps of each column by means of the support so that the central axes of the luminous beams produced by the lamps of each column converge towards a first focal area; and (c) orienting the lamps of each line by means of positioning elements mounted between the lamps and the support so that the central axes of the luminous beams of each line converge towards a second focal area.

13. The method according to claim 12, wherein the step (b) of orienting comprises the following steps:

tensioning a tension cable having opposite ends fixed to a flexible plate of the support, the flexible plate having a first surface onto which the lamps are disposed, the tension cable extending along the first surface of the plate, in parallel to the columns of lamps, a tension in the tension cable allowing to bend the plate so that the first surface takes a concave shape to orient said lamps of each column; and clamping a section of each of two stabilization cables with respect to the plate so as to stabilize the concave shape of the first surface, each of the stabilization cables extending along a second surface of the plate opposite to the first surface, the stabilization cables extending in parallel to the row of lamps, each stabilization cable having a first end provided with a spring fixed to the plate and a second end also fixed to the plate, the springs of the two cables being located on both sides of the sections which are clamped.

14. The method according to claim 13, further comprising the step of activating two lasers mounted on the flexible plate so as to be aligned with one of the columns and able to produce laser beams oriented in the same way as the central axes of projection of the luminous beams of the lamps of said one column so as to allow to determine by a convergence of the laser beams the distance between the first focal area and the support.

15. The method according to claim 12, wherein:

the step (c) of orienting comprises a step of mounting the lamps of the lines on a first surface of a flexible plate of the support; and the step (b) of orienting comprises the steps of:

tensioning a tension cable having opposite ends fixed to the plate and extending along the first surface of the plate, in parallel to the columns of lamps, a tension in the tension cable allowing to bend the plate so that the first surface takes a concave shape to orient said lamps of each column; and clamping a section of each of two stabilization cables with respect to the plate so as to stabilize the concave shape of the first surface, each of the stabilization cables extending along a second surface of the plate opposite to the first surface, the stabilization cables extending in parallel to the columns of lamps, each stabilization cable having a first end provided with a spring fixed to the plate and a second end also fixed to the plate, the springs of the two stabilization cables being located on both sides of the sections which are clamped.

16. The method according to claim 15, further comprising the following steps:

activating a first pair of lasers mounted on the flexible plate so as to be aligned with one of the columns of lamps and able to produce laser beams oriented in the same way as the central axes of projection of the luminous beams of the lamps of said one column so as to allow determination, by a convergence of the laser beams, of the distance between the first focal area and the support; and activating a second pair of lasers mounted on the flexible plate so as to be aligned with one of the lines of lamps and able to produce laser beams oriented in the same way as the central axes of projection of the luminous beams of the lamps of said one line so as to allow determination, by a convergence of the laser beams of the second pair, of the distance between the second focal area and the support.

* * * * *